Oct. 20, 1925.  1,558,062
B. D. THOMAS
CONVERTIBLE AIRPLANE
Filed April 14, 1922

Inventor
Benjamin Douglas Thomas
By Attorney
Edward H. Wright

Patented Oct. 20, 1925.

1,558,062

UNITED STATES PATENT OFFICE.

BENJAMIN DOUGLAS THOMAS, OF ITHACA, NEW YORK, ASSIGNOR OF ONE-TENTH TO THOMAS-MORSE AIRCRAFT CORPORATION, OF ITHACA, NEW YORK, A CORPORATION OF NEW YORK.

CONVERTIBLE AIRPLANE.

Application filed April 14, 1922. Serial No. 552,583.

*To all whom it may concern:*

Be it known that I, BENJAMIN DOUGLAS THOMAS, a subject of the King of Great Britain, and a resident of Ithaca, in the county of Tompkins and State of New York, have invented a certain new and useful Improvement in Convertible Airplanes, of which improvement the following is a specification.

This invention relates to airplanes, and has for its object to reduce the cost of production and make it possible to utilize the same fuselage, wing structure, and under carriage, on two or more different types of airplanes by making the nose or engine section detachable, so that the airplane may be readily convertible from one type to another with different seating capacity and type of engine.

It is necessary to use different types of airplanes for different classes of service or duty, for instance, a pursuit airplane is a single seater with a comparatively heavy water-cooled type of engine, while for a training airplane, additional seating capacity is required, and a lighter engine may be employed. By means of my invention, the same fuselage, wing structure, tail surfaces, and under carriage may be used for both types of airplanes, by providing two detachable nose or engine sections, either of which is adapted to be bolted on to the front end of the fuselage, one nose portion carrying simply a water cooled type of engine adapted to be controlled from the single seat in the fuselage, while the other nose portion has an additional cock pit with seating capacity for one or more, and carries an air cooled radial or rotary engine.

The necessary requirements in a conversion of this kind are that the weights must be approximately the same and the centre of gravity at practically the same point, that is to say, the moments of the respective weights about the centre of lift of the wing structure must be approximately the same so that the airplane shall be in balance with either nose section attached.

Figure 1:
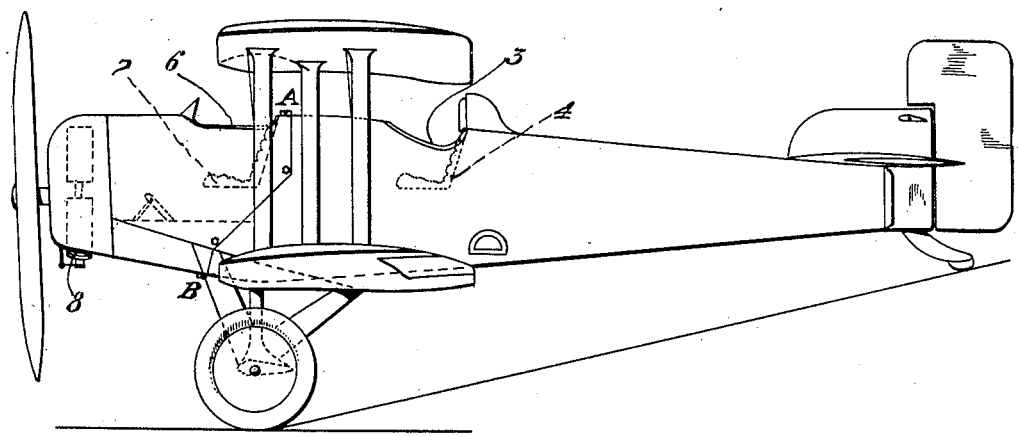

In the accompanying drawing: Figure 1 is a side elevation of a convertible airplane having a detachable nose portion provided with additional cock pit and seating capacity and a radial air cooled engine; and, Fig. 2, a side elevation showing, in full lines, a nose section with a water cooled type of engine attached to the fuselage, and, in dotted lines, the outline of the other type of nose portion.

Figure 2:
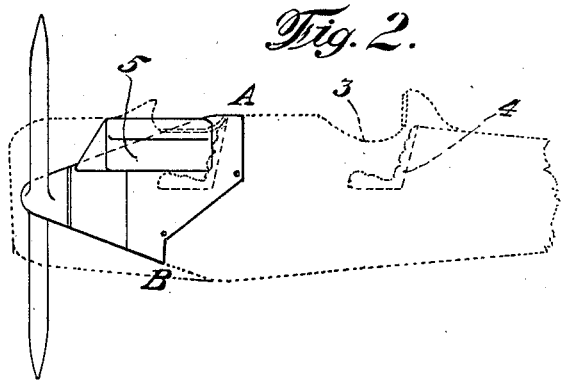

In the practice of my invention, the nose portion is made detachable from the front end of the fuselage at a point indicated by the line A—B, said fuselage being connected with the usual tail surfaces and wing structure and having a cock pit, 3, and seat, 4. The form of nose section shown bolted to the front end of the fuselage in Fig. 2 is of the pursuit type, with tapered cowling, and carrying the usual V type water cooled engine, 5. In order to convert the airplane into another type having a greater seating or load carrying capacity, the nose portion is detached and replaced by another such as shown in Fig. 1, having additional cock pit, 6, and seat, 7, and carrying at its forward end, a radial or rotary air cooled engine, 8. This engine is lighter than the other which affords the opportunity of carrying the additional persons or load under substantially the same weight conditions as before, that is the moments of the weights about the centre of lift of the airplane are approximately the same with either nose section, so that the same balance of the airplane is preserved in either case.

Having now described my invention, what I claim as new and desire to secure by Letters Patent is:

1. An airplane adapted for use as a single-seater or as a two-seater, comprising a fuselage terminating in front of the single-seater cockpit, and a nose portion, containing a second cockpit and a lighter motor, adapted to be fitted on and secured to the end of the fuselage in place of the nose portion containing a heavier motor.

2. In a convertible airplane, the combination with a fuselage body containing a cockpit, a nose portion containing a second cockpit and an engine, and means to detachably connect said nose portion to said fuselage body.

3. In a convertible airplane, the combination with a fuselage body containing a cockpit and having part of its framework extended forwardly, a nose portion containing a second cockpit and an engine, and means to detachably connect said nose portion to said framework.

In testimony whereof I have hereunto set my hand.

BENJAMIN DOUGLAS THOMAS.